(12) United States Patent
Xing et al.

(10) Patent No.: US 7,442,410 B2
(45) Date of Patent: *Oct. 28, 2008

(54) METHOD FOR ENCAPSULATING PHASE TRANSITIONAL PARAFFIN COMPOUNDS USING MELAMINE-FORMALDEHYDE AND MICROCAPSULE RESULTING THEREFROM

(75) Inventors: Jianwei Xing, Hong Kong SAR (CN); Yi Li, Hong Kong SAR (CN); Edward Newton, Hong Kong SAR (CN)

(73) Assignee: Nano-Sports Technologies Ltd., Central (HK)

( * ) Notice: Subject to any disclaimer, the term of this patent is extended or adjusted under 35 U.S.C. 154(b) by 854 days.

This patent is subject to a terminal disclaimer.

(21) Appl. No.: 10/327,034

(22) Filed: Dec. 24, 2002

(65) Prior Publication Data

US 2004/0121072 A1    Jun. 24, 2004

(51) Int. Cl.
*B01J 13/18* (2006.01)
(52) U.S. Cl. .................. 427/213.34; 264/4.7; 264/4.32; 264/4.33
(58) Field of Classification Search ............. 427/213.3, 427/213.31, 213.32, 213.33, 213.34, 213.35, 427/213.36; 264/4, 4.1, 4.3, 4.32, 4.33, 4.4, 264/4.7
See application file for complete search history.

(56) References Cited

U.S. PATENT DOCUMENTS

| 3,726,804 | A | | 4/1973 | Matsukawa et al. |
|---|---|---|---|---|
| 3,968,060 | A | * | 7/1976 | Vincent et al. ................ 521/76 |
| 3,981,821 | A | * | 9/1976 | Kiritani et al. ............... 264/4.3 |
| 4,230,809 | A | * | 10/1980 | Heinrich et al. ............... 521/65 |
| 4,756,958 | A | | 7/1988 | Bryant et al. |
| 5,290,904 | A | | 3/1994 | Colvin et al. |
| 5,456,852 | A | | 10/1995 | Isiguro |
| 5,916,478 | A | | 6/1999 | Nakahira et al. .............. 252/73 |
| 2003/0222378 | A1 | * | 12/2003 | Xing et al. .................. 264/432 |

FOREIGN PATENT DOCUMENTS

| GB | 2015611 A | 9/1979 |
|---|---|---|
| JP | 56-100629 A | 8/1981 |
| JP | 7-133479 A | 5/1995 |
| JP | 7-171378 A | 7/1995 |
| JP | 7-171379 A | 7/1995 |
| WO | WO 03/099427 A1 | 12/2003 |

* cited by examiner

*Primary Examiner*—Thao T. Tran
(74) *Attorney, Agent, or Firm*—Buchanan Ingersoll & Rooney PC (57) ABSTRACT

A process for the microencapsulation of phase transitional paraffin compounds is described. Polypropylene glycols with the average molecule weight over 400 were used as the surface tension modifiers for emulsifying the paraffin compounds. Polyisocyanates capable of being dissolved in the phase change materials were employed to promote the deposition of melamine, partially methylolated melamine and the precondensate of melamine-formaldehyde onto the hydrophobic droplets for the microencapsulation. The prepared emulsion of microencapsulated phase change materials was successfully coated on textile fabrics and the coated products showed improved thermal regulation function.

32 Claims, 5 Drawing Sheets

Figure 1. SEM Photo of Microencapsulated Octadecane

Fig.2. SEM Photo of Damaged Fabric

Fig.3. SEM Photo of Fabric Surface

Fig. 4. Relationship between Microcapsule Content and Qmax

Fig.5. Relationship between Microcapsule on Thermal Conductivity

METHOD FOR ENCAPSULATING PHASE TRANSITIONAL PARAFFIN COMPOUNDS USING MELAMINE-FORMALDEHYDE AND MICROCAPSULE RESULTING THEREFROM

FIELD OF THE INVENTION

This invention relates to methods for encapsulating phase transitional paraffin compounds, and the resulting microcapsules.

BACKGROUND OF THE INVENTION

A variety of phase change materials available are well known for their thermal characteristics in that during their phase change stage they can absorb or release the latent heat while the temperature of the material is kept constant. Textiles and other products incorporated with the phase change materials, especially in the microencapsulated forms, may establish a microclimate surrounding the modified goods in the temperature ranges of the melting points of the employed phase change materials (PCMs) and so may meet the requirement for comfort. The use of microencapsulated PCMs may be found in U.S. Pat Nos. 4,756,958 and 5,290,904.

U.S. Pat. Nos. 5,456,852 and 5,916,478 both describes processes of microcapsule manufacturing employing in situ polymerization, in which formaldehyde used may impose an environmental danger.

Examples of useful inherently flame retardant phase change materials may include halogenated paraffins having 10 to 22 carbon atoms and, more specifically, mono or polychlorinated and brominated paraffins such as bromooctadecane, bromopentadecane, bromononodecane, bromoeicosane, bromodocosane, and so on. Throughout the investigation of the present invention it is found that the micro-encapsulation of paraffin compounds is much more difficult than the relative processes for the other core materials mainly due to the unique characteristics of paraffin compounds. In particular, such PCMs have melting points in the region of 20 to 110° C. and solubility compatibility issues.

U.S. Pat. No. 6,077,597 to Pause teaches that an interactive thermal insulating system with three layers can be established. The first layer is a layer in high density comprising a substrate coated with a polymer binder in which a plurality of microspheres containing a phase change material are dispersed. The second layer is a low density fibrous mesh in which individual fibers contain a plurality of microspheres containing a phase change material dispersed therein. A third layer is a flexible substrate. The fibrous mesh is sandwiched between the coated layer and the third layer.

Although the above microencapsulation processes may be of great importance, they may still suffer from some drawbacks. The shell of the microcapsules as prepared in the above processes may be somewhat permeable especially when heated at high temperatures (for example at 130° C. and above) in a dry state, which may be necessary for fabrics coating in the curing stages. Further, residual formaldehyde in the emulsion may not be controlled effectively.

OBJECTS OF THE INVENTION

Therefore, it is an object of this invention to resolve at least one or more of the problems as set forth in the prior art. As a minimum, it is an object of this invention to provide the public with a useful choice.

SUMMARY OF THE INVENTION

Accordingly, this invention provides a method for encapsulating a core component comprising paraffin compounds that can undergo phase transition, including the steps of:
  A dissolving first monomers in the core component to form a first solution, said first monomers forming a first polymer;
  B dispersing the first solution into a second aqueous solution to form an emulsion;
  C adding said emulsion to a third aqueous solution containing a precondensate of melamine-formaldehyde to form a encapsulation mixture The method of this invention is characterized in that said first monomers are a polypropylene glycol with an average molecular weight higher than about 400 and a polyisocyanate soluble in said core component.

Preferably, the second solution includes at least one protective colloid being a polymer having at least one anionic functional group. More preferably, the anionic functional group is selected from the group consisting of carboxylic group, sulfonic group, phosphonic group, or their mixture. Further, said anionic functional group is preferred to be carboxylic group.

Preferably, said polyisocyanate are selected from the group consisting of tolylenediisocyanate, 1,6-hexamethylenediisocyanate, or their mixture. Said polyisocyanate can be in an amount of about 0.2 to 3%, more preferably about 0.3 to 1%, weight with respect to the weight of the core component.

Alternatively, said polyisocyanate is dissolved in the core component at a temperate of about 5° C. higher than the melting point of the core component.

Preferably, the first solution is dispersed into the second solution at a temperature of about 5° C. higher than the melting point of the core component.

The method of this invention may also have the following options:
  second solution has a pH of about 4 to 7, preferably about 4.7 to 6, and more preferably about 5.5 to 5.7.
  the protective colloid is in an amount of about 1 to 3%, more preferably 1.5 to 2.5%, weight with respect to the weight of the second solution.
  the first solution is dispersed into the second solution at a stirring rate of about 2000 revolutions per minute for about 10 to 15 minutes
  the melamine and formaldehyde is in a molar ratio of about 1:3, preferably 1:2, and more preferably 1:1.3 to 1:1.8 (melamine:formaldehyde)
  the melamine and the formaldehyde are mixed at about 70° C. and for about 1 to 1.5 hours to form the precondensate.
  the emulsion is added to the third solution at a stirring rate of about 400 to 600 revolutions per minute.
  the pH of the encapsulation mixture is adjusted to about 4 to 7, preferably 4.7 to 6, and more preferably 5.5 to 5.7.

Preferably, the method of this invention may also include the step of raising the temperature of the encapsulation mixture to about 70 to 80° C. An additional step of maintaining the temperature of the encapsulation mixture at about 70 to 80° C. for about 1 to 5 hours, more preferably for about 2 to 4 hours. Optionally, the method of this invention may also include the step of at least one adding formaldehyde scavenger to the encapsulation mixture, wherein the formaldehyde scavenger is selected from the group consisting of ethylene urea, diethylene glycol, or their mixture. The formaldehyde scavenger is preferred to be in an amount of 0.1 to 1%, preferably 0.3 to 0.6%, weight with respect to the weight of the emulsion mixture. Additionally, the formaldehyde scavenger is added at about 0.5 to 1 hour before the end of the step of maintaining the temperature of the encapsulation mixture at about 70 to 80° C. Further, the pH of the encapsulation mixture may be adjusted to about 7.5 after the end of the step of maintaining the temperature of the encapsulation mixture at about 70 to 80° C.

BRIEF DESCRIPTION OF THE DRAWINGS

Preferred embodiments of the present invention will now be explained by way of example and with reference to the accompany drawings in which.

DETAIL DESCRIPTION OF PREFERRED EMBODIMENTS

This invention is now described by ways of example with reference to the figures in the following paragraphs.

Throughout the description the term "paraffin compounds" refers to both paraffin compounds and their relative bromo-derivatives. "Phase transitional paraffin compounds" refer to those paraffin compounds that can undergo phase transition. Preferably, paraffin compounds with the straight molecule chain of 10 to 22 carbons and their bromo-derivatives may suit this requirement.

As the microencapsulated paraffin compounds may be applied onto textile fabrics through the coating and the phase change occurs only within the microcapsules the shell should possess low permeability at both ordinary and high temperatures. For this purpose a conventional in situ condensation process (with melamine and formaldehyde as the monomers) for microencapsulation was preferred and selected. Throughout the research process of the present invention it was found that the paraffin compounds with different lengths of strait alkyl chains are difficult to be well emulsified due to their low surface tension and therefore proper surface tension modifiers should be added for satisfactory emulsification. On the other hand polyisocyanates capable of being dissolved in the paraffin compounds were employed because they can react with the free amino groups on melamine, methylolated melamine and the precondensate of melamine-formaldehyde to form the first outer layer of the shell. The precondensate of melamine in the continuous phase, when it become less soluble along with the condensation, will possess much higher affinity for the first layer aforementioned than for the surface of the oil droplets of the paraffin compounds alone and deposits more easily on the "pre-wrapped" droplets.

The procedures including both preparing the microcapsule emulsion and coating fabrics are given in the following steps.

The first preparation step in the manufacturing of the microcapsules is the synthesis of the melamine-formaldehyde precondensate.

This process comprises mixing the melamine, formaldehyde and water to form a precondensate or third solution. Preferably, the system is heated at 70° C. under stirring for 1 to 1.5 hours to enhance the forming of the precondensate. The precondensate or third solution may then be cooled to ambient temperature and stored for further use.

It was found that the molecule ratio of melamine to formaldehyde in the preparation of the precondensate is important to the microencapsulation of this invention. In the conventional in situ condensation process, with melamine and formaldehyde as the precondensate monomers, the molar ratio of melamine to formaldehyde can be from 1:1 to 1:6. However, the low melamine to formaldehyde ratios may not be suitable to the PCMs of this invention, which are generally paraffin compounds. The precondensate formed with low melamine to formaldehyde ratios may be too hydrophilic causing unsatisfactory deposition. It was found in this invention that a relatively high molar ratio of melamine to formaldehyde in the precondensate preparation should be employed for satisfactory deposition of the precondensate onto the droplets of the core materials. The satisfactory molar ratio of melamine to formaldehyde may be 1:3, more preferably 1:2 and most preferably 1:1.3 to 1:1.8. It is believed that this may provide more free amino groups on the melamine ring in the precondensate and under acidic condition, which may in turn affect the choice of protective colloids in this invention and will be discussed later.

The second preparation step is to dissolve adequate quantities of protective colloids in water to prepare a second solution as the vehicle for emulsification.

Using melamine and formaldehyde as the monomers to form the aminoplast as the shell of microcapsules is known in the art. The pre-prepared aqueous solution of precondensate of melamine-formaldehyde including dissolved melamine and methylolated melamine is usually added to the already emulsified core materials and the condensation continues under acidic condition. Along with the condensation process the formed aminoplast molecules become large enough and less dissolved in the aqueous continuous phase and so they deposit on the droplets of the core materials and then continue to condensate to form the polymeric shell. In this process the protective colloids possessing the groups reactive towards N-methylol groups on melamine ring should not be employed in order to prevent the reaction between the protective colloids and the partially methylolated melamine and the precondensate of melamine-formaldehyde. According to the above restriction any natural or synthetic anionic polymer, e.g., polymers containing anionic functional groups can be used as a protective colloid. "Anionic functional group" means a functional group as defined herein which possesses a net negative charge. Representative anionic functional groups include carboxylic, sulfonic, phosphonic, their alkylated derivatives, and so on. The choice of anionic functional group is based upon several factors including the reactivity of the resulting polymer to the reactants of the system including melamine, and cost.

Examples of suitable natural polymers for use as protective colloids are gum arabic and alginic acid. Examples of semi-synthetic anionic polymers are carboxymethyl cellulose, phthalated gelatin, sulfated starch, cellulose sulfate, and lignin sulfonic acid. Synthetic anionic polymers which can be used in this invention include maleic anhydride based copolymers (including those copolymers hydrolyzed), acrylic acid based homopolymers and copolymers (including methacrylic acid based homopolymers and copolymers), vinyl-benzene-sulfonic acid based homopolymers and copolymers, and carboxy modified polyvinyl alcohols.

In the research work of the present invention the copolymer of styrene and maleic acid (or anhydride) and polyacrylic acid are employed. It is found that carboxyl groups are very sensitive to bath pH and low bath pH would cause the agglomeration and bigger particles form. The bath pH also significantly affects the emulsification and usually it is adjusted from 4 to 7. In the research work for the present invention bath pH for the condensation should be controlled from 4.7 to 6.0 and preferably from 5.5 to 5.7. The addition amount of the protective colloids is limited since overdose of them can adversely affect the formation of the microcapsules and also adversely affect the handles of the coated fabrics. For the copolymer of styrene and maleic acid (or anhydride) and polyacrylic acid the addition should be limited to 1.0% to 3.0% and preferably 1.5% to 2.5% based on the weight of the continuous phase.

As mentioned above, there may be more free amino groups on the melamine rings in the precondensate. This can be necessary for continuing the condensation, and the protonated amino groups may then interact with the anionic groups on the protective colloid molecules and the deposition process will be interfered. For this reason, the protective colloids possessing carboxyl groups, the weakly anionic groups under acidic condition, are preferred and the copolymer of styrene and maleic acid (or anhydride) and polyacrylic acid possessing carboxyl groups were thus selected in the research of the present invention.

The above two preparations steps are not required to be in particular order.

The first manufacturing step is to dissolve polyisocyanates and polypropylene glycols in the PCMs paraffin compounds to form a first solution.

Preferably, this step should be carried at the temperature of at least 5° C. higher than the melting points of the paraffin compounds and the system is mixed well. Acceptable candidates of both the polyisocyanates and polypropylene glycols should be those which can be dissolved in the paraffin compounds employed.

Fine microcapsules are hardly prepared if a poor emulsifier is selected. Modification of the surface tension of the core materials is thus essential for satisfactory emulsification. Proper surface tension modifiers should be those organic chemicals, which are compatible with the paraffin compounds, polar in their nature and safe for application. In the research work for the present invention polypropylene glycols with the average molecule weight higher than 400 were found to be satisfactory candidates for the above purpose. Easier and better emulsification could be obtained when 0.2% to 3.0%, preferably 0.3% to 1.0% of such propylene glycols, based on the weight of the core material, was added to the hydrophobic mixture to be emulsified. It is believed that the droplets of the core materials with modified surface tension became much more stable in the hydrophilic environment. The relative little amount of the glycols to the core phase may not significantly affect the phase transition properties of the paraffin compounds.

Suitable polyisocyanates will be discussed in later paragraphs.

The amount of polyisocyanates to be added can range from 0.01% to 5% and preferably from 0.05% to 0.2% based on the weigh of the core materials. 0.2% to 3.0%, preferably 0.3% to 1.0% of propylene glycols based on the weight of the core material, is preferably used.

The second manufacturing step is to add the organic core composition (the discontinuous phase or the first solution) into the protective colloid vehicle (the continuous phase or the second solution as prepared above) and emulsify them to form an emulsion.

Preferably, this emulsifying step is performed by means of stirring at the temperature of at least 5° C. higher than the melting points of the paraffin compounds for 10 to 15 minutes. As polypropylene glycols, the surface tension modifiers which can make the emulsification much easier, exist in the discontinuous phase, a normal stirrer used in laboratory with the stirring speed of 2,000 rpm may be capable of producing the oil droplets with the average diameters of 4 to 5 micrometers or less. However, it may be preferred to stir the mixture for 10 to 15 minutes to form the emulsion.

The third manufacturing step is to add the pre-prepared precondensate third solution to the emulsion under mild stirring (usually 400 to 600 rpm). In this process mild stirring is of great importance since vigorous stirring is found to adversely affect the deposition of the melamine, partially methoxylated melamine and the precondensate onto the oil droplets in the emulsion and also damage the newly formed microcapsules.

Acidification of the system after adding precondensate solution is preferred and usually the pH of the system is adjusted to 4 to 7, preferably 4.7 to 6, and more preferably 5.5 to 5.7.

To facilitate the encapsulation process, the temperature of the encapsulation mixture may then be raised to a higher temperature for sufficient time. Without any restriction thereof, the temperature is preferred to be about 70 to 80° C. to initialize the condensation and continue the reaction for a period of time ranging from about 1 to 5 hours, preferably 2 to 4 hours.

Additionally, preferably about 0.5 to 1 hour before the end of the reaction, formaldehyde scavengers such as ethylene urea and diethylene glycol may then be added. The addition amount of ethylene urea or diethylene glycol ranges from about 0.1% to 1% and preferably from 0.3% to 0.6% with respect to the weight of the microcapsule emulsion.

Finally, the pH of the encapsulation mixture is adjusted to about 6.5 to 8.0, preferably 7.0 to 7.8 by adding suitable base like potassium or sodium hydroxide solution, carboxylate salts, or other readily available strong or weak bases to end the condensation and then cool the bath under mild stirring to ambient temperature. The base used is of no importance but merely to achieve the pH adjustment.

The following process was used to test the result of the encapsulation process in this invention, and is described herein. However, of course other suitable testing methods or processes may be used instead.

One drop of the formed microcapsule emulsion is coated onto a glass slide and then the glass slide is dried at 60° C. in a laboratory oven and then cured at 130° C. for 4 minutes. Some emulsion is taken and mixed with the binders, softeners and water available for fabric coating in a proper ratio to form a stable coating emulsion. As discussed earlier, the emulsion pH is adjusted to around 7.5. The formed emulsion is coated onto a fabric sample, which is then dried and cured to fix the microcapsules on the fabric sample. Usually this process is performed in the same way as employed in the conventional coating process. For the end products such as blankets and the like spray coating technique is preferred. Both of the glass slide and the fabric samples were checked with a scanning electronic microscope for observing the state of the microcapsules.

The PCM microcapsules were coated onto a series of fabric samples. Scientific experiments were carried out to measure the dynamic surface temperature changes during the transients when the fabrics equilibrated to an environment of 20° C., were brought into contact with a hot plate of 33° C. in simulating human skin temperature. In comparison with the control fabric samples, significant differences were found in surface temperature changes, which were measured by using an infrared thermal image camera. Also, significant differences were observed between control and treated fabrics in the objectively measurement coolness index $Q_{max}$. These test results show that the PCM microcapsules produced by this invention were able to provide an improvement in thermal function performance in comparison with conventional products.

Deposition of melamine-formaldehyde precondensate in the third solution onto the droplets of the core materials in the emulsion is essential in the in situ condensation microencapsulation. It was found in this invention that in this process, not all the precondensates in the third solution deposit onto the droplets to be encapsulated and some of them will self-condensate to form the polymer existing in the continuous phase or the third solution. This defect may lead to the very thin capsule shell and more seriously result in some unencapsulated core materials. Thus promoting the deposition of melamine-formaldehyde precondensate on the oily droplets is of great importance for complete encapuslation.

Firstly, as described above, the molar ratio of melamine to formaldehyde in the preparation of the precondensate is relatively low for reducing the interfacial tension between the precondensate and the oily core materials that is hydrophobic in nature. Further, there may be more intense ionic interaction under acidic condition between the precondensate and the protective colloids with anionic groups attached on the molecule backbone. This is why the second solution and the encapsulation mixture are preferred to be maintained at a low pH. Therefore, some means for promoting the deposition of the relatively less methoxylated precondensate onto the oily droplets may be required.

Secondly the relatively abundant amino groups on the melamine ring can easily react with the polyisocyanates in the core to form a polyurea layer around the hydrophobic droplets, and the affinity between the polyurea layer and the precondensate in the continuous phase may be relatively high.

Thirdly the unreacted polyisocyanates inside the polyurea layer may react with the polypropylene glycols to form yet another polyurethane layer and this layer can be connected with the polyurea layer through isocyanate functionalities.

Therefore, the oily core materials can be wrapped with three layers: a polyurethane layer (formed by unreacted polyisocyanates with polypropylene glycols), a polyurea layer (formed by unreacted polyisocyanates with melamine) and an aminoplast (formed by melamine with formaldehyde) layer. A microcapsule with high retainability may then result.

However, some polyisocyanates, especially those with more than two isocyanates groups, are not compatible with the paraffin compounds employed in the work for the present invention. Polyisocyanates soluble in the core materials should be used. Preferred polyisocyanates that work efficiently in the preparation of the microcapsules are tolylenediisocyanate and 1,6-hexamethylenediisocyanate. In the final stage of the microcapsule preparation cyclic urea such as ethylene urea and polyglycols such as diethylene glycol were added under acidic condition as the formaldehyde scavengers to reduce the residual formaldehyde content.

The microencapsulated paraffin compounds emulsion can generally be handled relatively easily and can be applied as the medium for temperature management in many fields. For example, the microcapsules prepared in the present invention can be used for the treatment of textile fabrics and the end products can be in the state of stable and neutral emulsion. Binders, softeners and other additives necessary for fabric coating can thus be mixed with the above emulsion in proper ratios to form stable coating emulsions. Binders for fabric coating compatible with the microcapsule emulsion can be added in a wide range of amounts according to the fastness properties and fabric handles. Softeners are mainly the emulsions of polysiloxane and their derivatives and the addition amount is mainly determined in terms of the handle requirement. Fabric coatings are carried out in all the conventional procedures and the spray coating is preferred for the treatment of blankets and the similar products.

EXAMPLES

This invention is now illustrated by the following examples, which shall not be interpreted as limiting.

Example 1

Preparation of the Melamine-Formaldehyde Precondensate

Add 2.5 g of melamine to 3.6 g of formaldehyde (35-39% aqueous solution) and then 5 g of water is added to the system. Stirring the system at 70° C. for around 1 hour to form a transparent solution. Cool the system to 33° C.

Example 2

Preparation of Microcapsule Emulsion Using PSMS as the Protective Colloid and TDI as the Deposition Promoter Add 2.5 g of Poly(Styrene-alt-Maleic Acid) Sodium Salt (30% in water, average Mw ca. 120,000) in 57.5 g of water and then adjust bath pH to 5.

Figure 1:
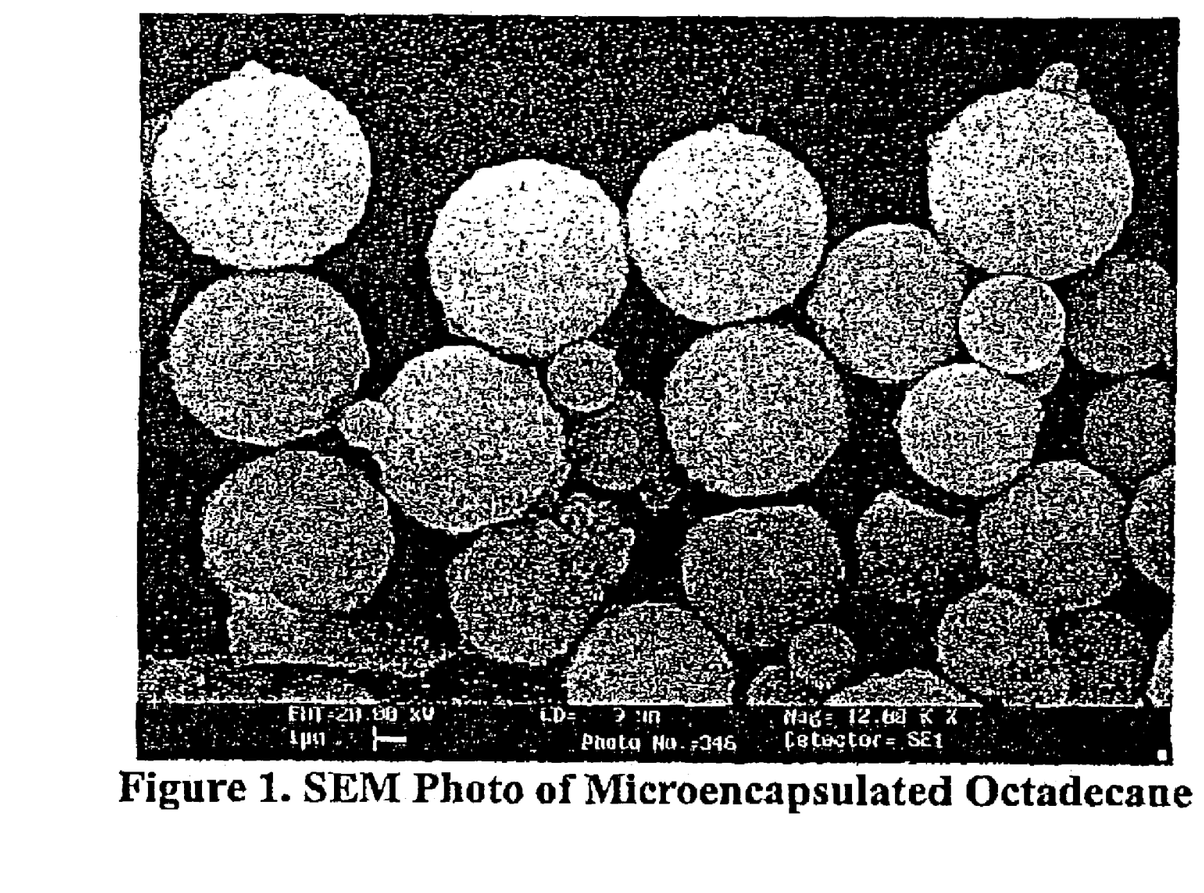
FIG. 1 shows the SEM photo of microencapsulated octadecane prepared according to Example 1.

Melt 30 g of octadecane at 33° C. and then respectively add 0.15 g of polypropylene glycol (average Mw ca. 2,000) and 0.1 g of tolylenediusocyanate, TDI, (80%). Mix the system well and keep it thermostat. Add the core composition prepared above to the protective colloid solution at 31-33° C. and then vigorously stir the system at 2,000 rpm for 10 to 15 minutes. Decrease the stirring to 400-600 rpm and gradually add the melamine-formaldehyde precondensate solution to the bath and then continue the stirring for 10 minutes. Check bath pH and adjust it to 5.6 if necessary. Raise the bath to 70° C. and then continue the reaction for 2 hours. Add 0.4 g of ethylene urea to the bath and then continue the reaction for 1 hour. Adjust bath pH to 7.5 and cool the bath to ambient temperature under mild stirring. Take one drop of the microcapsule emulsion and coat it onto a glass slide. Dry the coated glass slide at 60° C. and then cure it at 130° C. for 4 minutes. The SEM photo the microcapsule is given in FIG. 1.

Example 3

Preparation of Microcapsule Emulsion Using PSMS as the Protective Colloid and HDI as the Deposition Promoter All the procedures are as same as those indicated in example 2 except that 0.1 g of 1,6-hexamethylenediisocyanate, HDI, other than TDI is added as the deposition promoter.

Example 4

Preparation of Microcapsule Emulsion Using Polyacrylic Acid as the Protective Colloid and TDI as the Deposition Promoter All the procedures are as same as those indicated in example 2 except that 3.5 g of polyacrylic acid (25% in water, average Mw ca 230,000) other than PSMS is used as the protective colloid.

Example 5

Preparation of Microcapstile Emulsion Using Polyacrylic Acid as the Protective Colloid and HDI as the Deposition Promoter All the procedures are as same as those indicated in example 4 except that 0.1 g of HDI other than TDI is added as the deposition promoter.

Example 6

Preparation of Microcapsule Emulsion Using Both PSMS and Polyacrylic Acid as the Protective Colloids and without Polyisocyanates as the Deposition Promoters All the procedures are as same as those indicated respectively in example 2 and 4 except that without any polyisocyanates being added as the deposition promoters. Some white solid flakes are observed in the final bath, which are the products formed by the self-condensation of melamine-formaldehyde precondensate.

Example 7

Fabric Coating Using the Microcapsule Emulsion

For every microencapsulated paraffin compound emulsion six coating emulsions with different microcapsule content were prepared according to the following recipe and were adjusted to pH 7.5. Binder used in this example is the emulsion of the copolymer of polyacrylic acid and the softener is the emulsion of epoxy-modified polysiloxane.

| Details | 1 | 2 | 3 | 4 | 5 | 6 |
|---|---|---|---|---|---|---|
| Microcapsules (20%, g) | 0 | 0 | 5 | 8.5 | 13 | 17 |
| Microcapsule Contents (g/m$^2$) | 0 | 0 | 20 | 40 | 60 | 80 |
| Binder (g) | 0 | 2 | 2 | 2 | 2 | 2 |
| Softener (g) | 0 | 3 | 3 | 3 | 3 | 3 |
| H$_2$O (g) | 0 | 35 | 30 | 26 | 22 | 18 |
| Drying | | | 110° C., 8 min | | | |
| Curing | | | 130° C., 4 min | | | |

Figure 2:
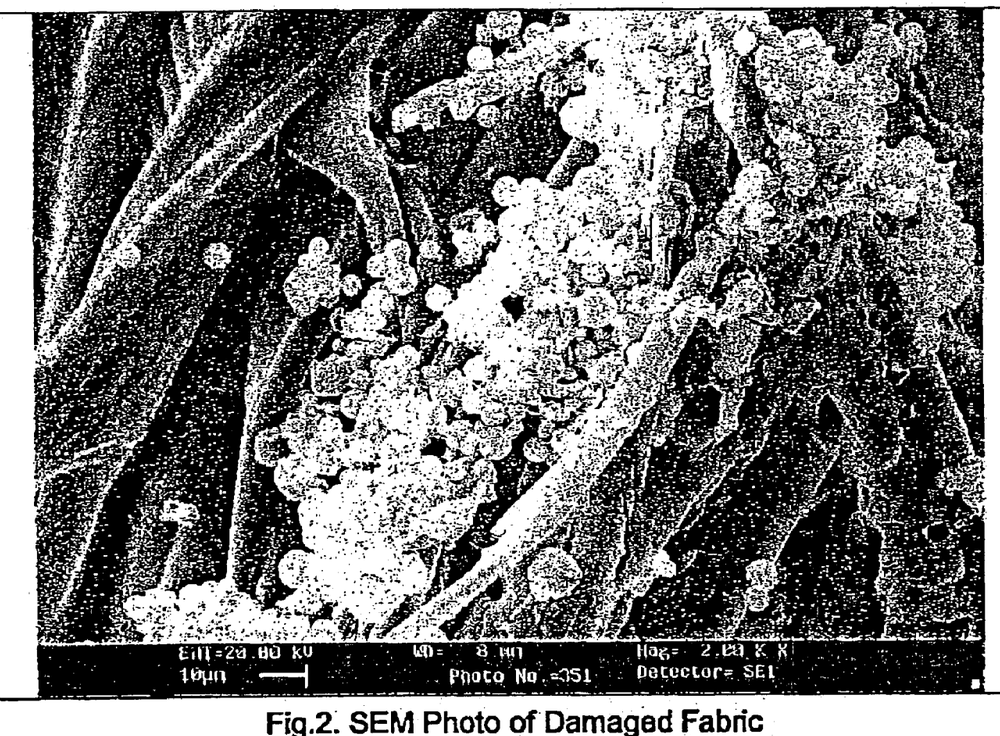
FIG. 2 shows the SEM photo of the state of the microcapsules prepared according to the method of this invention of damaged fabric.
Figure 3:
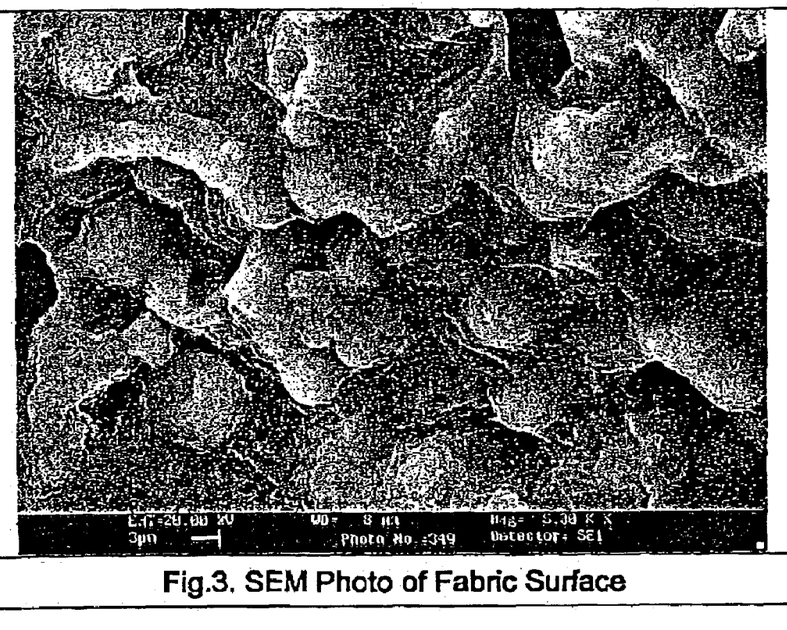
FIG. 3 shows the SEM photo of the state of the microcapsules prepared according to the method of this invention of fabric surface.

Every emulsion is respectively coated onto a fabric sample and then the sample is dried at 110° C. for 8 minutes and cured at 130° C. for 4 minutes on a curing machine used in laboratory. Scanning electronic microscope is used to observe the state of the microcapsules in the coated fabrics. The typical photos are respectively given in FIG. 2 and FIG. 3.

It is found that during the curing stages there is a slight fume evaporated from the fabric samples coated with the microencapsulated octadecane without any polyisocyanates added as the deposition promoters and the treated fabric samples possess an oily handle. And for those with polyisocyanates addition no any fume is observed and the treated fabric samples are all dry. This indicates that the employment of polyisocyanates as the deposition promoters can reduce the permeability of the microcapsule shell or increase the retainability of the microcapsules.

Example 8

Determination of the Thermal Regulation Function of the Coated Fabrics

Figure 4:
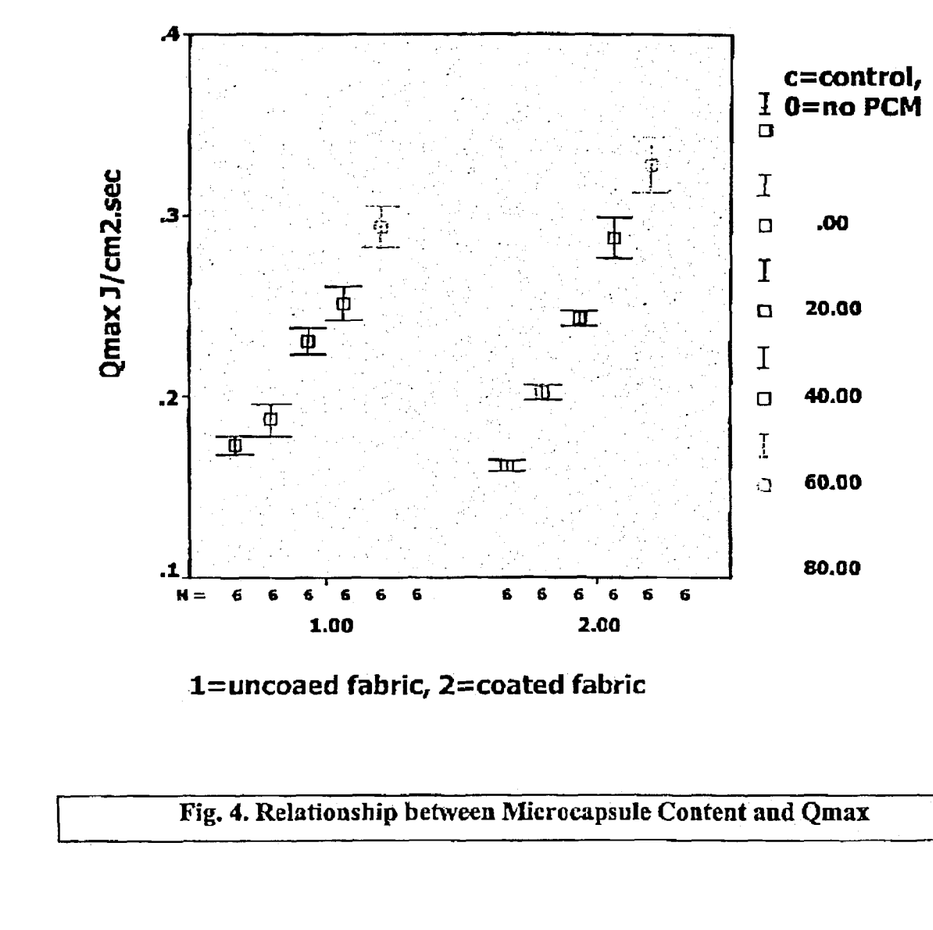
FIG. 4 shows the relationship between microcapsule content and $Q_{max}$.
Figure 5:
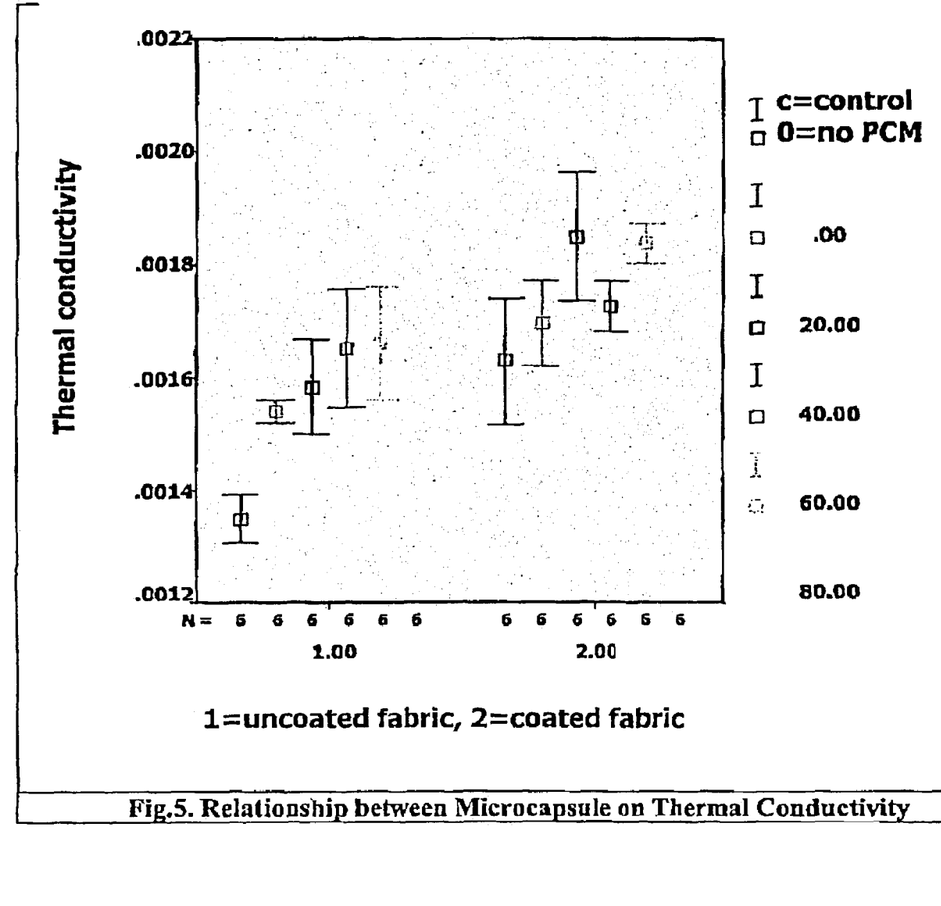
FIG. 5 shows relationship between microcapsule content and thermal conductivity.

The determinations are performed in the methods indicated before and the relative results are given respectively in FIG. 4, Table 1, FIG. 5 and Table 2.

TABLE 1

Effect of Microcapsule Content on Qmax

| Source | Type III Sum of Squares | df | Mean Square | F | Sig. |
|---|---|---|---|---|---|
| Corrected Model | 0.278 | 11 | 2.527E−02 | 260.990 | 0.000 |
| Intercept | 4.610 | 1 | 4.610 | 47616.118 | 0.000 |
| FABRIC | 8.299E−03 | 1 | 8.299E−03 | 85.716 | 0.000 |
| PCM | .264 | 5 | 5.273E−02 | 544.670 | 0.000 |
| FABRIC* PCM | 5.985E−03 | 5 | 1.197E−03 | 12.364 | 0.000 |
| Error | 5.809E−03 | 60 | 9.682E−05 | | |
| Total | 4.894 | 72 | | | |
| Corrected Total | 0.284 | 71 | | | |

$R^2 = 0.980$ (Adjusted $R^2 = 0.976$)
Dependent Variable: $Q_{max}$ with PCM treated surface

TABLE 2

Effect of Microcapsule Content on Thermal Conductivity

| Source | Type III Sum of Squares | df | Mean Square | F | Sig. |
|---|---|---|---|---|---|
| Corrected Model | 1.670E−06 | 11 | 1.518E−07 | 26.482 | .000 |
| Intercept | 2.017E−04 | 1 | 2.017E−04 | 35176.889 | 0.000 |
| FABRIC | 8.550E−07 | 1 | 8.550E−07 | 149.129 | 0.000 |
| PCM | 6.611E−07 | 5 | 1.322E−07 | 23.062 | 0.000 |
| FABRIC* PCM | 1.540E−07 | 5 | 3.081E−08 | 5.373 | 0.000 |
| Error | 3.440E−07 | 60 | 5.733E−09 | | |
| Total | 2.037E−04 | 72 | | | |
| Corrected Total | 2.014E−06 | 71 | | | |

$R^2 = 0.829$ (Adjusted $R^2 = 0.798$)
Dependent Variable: Thermal conductivity with PCM treated surface While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A method for encapsulating a core component comprising paraffin compounds that can undergo phase transition, comprising the steps of:
   A dissolving first monomers of the core component to form a first solution, said first monomers forming a first polymer;
   B dispersing the first solution into a second aqueous solution to form an emulsion;
   C adding said emulsion to a third aqueous solution containing a precondensate of melamine-formaldehyde to form an encapsulation mixture by in situ condensation microencapsulation,
   wherein
      said first monomers comprise a polypropylene glycol with an average molecular weight higher than about 400 and a polyisocyanate soluble in said core component; and
      said core component is encapsulated with a polyurethane layer, a polyurea layer and an aminoplast layer.

2. The method of claim 1, wherein said second solution includes at least one protective colloid being a polymer having at least one anionic functional group.

3. The method of claim 2, wherein said anionic functional group is selected from the group consisting of a carboxylic group, sulfonic group, phosphonic group, and a mixture thereof.

4. The method of claim 3, wherein said anionic functional group is carboxylic group.

5. The method of claim 2, wherein said protective colloid is in an amount of about 1 to 3% weight with respect to the weight of the second solution.

6. The method of claim 2, wherein said second solution has a pH of about 4 to 7.

7. The method of claim 6, wherein said second solution has a pH of about 4.7 to 6.

8. The method of claim 7, wherein said second solution has a pH of about 5.5 to 5.7.

9. The method of claim 1, where said polyisocyanate is selected from the group consisting of tolylenediisocyanate, 1,6-hexamethylenediisocyanate, and a mixture thereof.

10. The method of claim 9, wherein said polyisocyanate is in an amount of about 0.2 to 3% weight with respect to the weight of the core component.

11. The method of claim 10, wherein said polyisocyanate is in an amount of about 0.3 to 1% weight with respect to the weight of the core component.

12. The method of claim 1, wherein said polyisocyanate is dissolved in the core component at a temperature of about 5° C. higher than the melting point of the core component.

13. The method of claim 1, where the first solution is dispersed into the second solution at a temperature of about 5° C. higher than the melting point of the core component.

14. The method of claim 1, wherein the first solution is dispersed into the second solution at a stirring rate of about 2000 revolutions per minute for about 10 to 15 minutes.

15. The method of claim 1, wherein the melamine and formaldehyde are in a molar ratio of about 1:3 (melamine:formaldehyde).

16. The method of claim 15, wherein the melamine and formaldehyde are in a molar ratio of about 1:2 (melamine:formaldehyde).

17. The method of claim 16, wherein the melamine and the formaldehyde are in a molar ratio of about 1:1.3 to 1:1.8 (melamine:formaldehyde).

18. The method of claim 1, wherein the melamine and the formaldehyde are mixed at about 70° C. and for about 1 to 1.5 hours to form the precondensate.

19. The method of claim 1, wherein the emulsion is added to the third solution at a stirring rate of about 400 to 600 revolutions per minute.

20. The method of claim 1, wherein the pH of the encapsulation mixture is adjusted to about 4 to 7.

21. The method of claim 20, wherein the pH of the encapsulation mixture is adjusted to about 4.7 to 6.

22. The method of claim 21, wherein the pH of the encapsulation mixture is adjusted to about 5.5 to 5.7.

23. The method of claim 1 further comprising the step of raising the temperature of the encapsulation mixture to about 70 to 80° C.

24. The method of claim 23 further comprising the step of maintaining the temperature of the encapsulation mixture at about 70 to 80° C. for about 1 to 5 hours.

25. The method of claim 24, wherein the temperature of the encapsulation mixture is maintained at about 70 to 80° C. for about 2 to 4 hours.

26. The method of claim 23 further comprising the step of adding at least one formaldehyde scavenger to the encapsulation mixture.

27. The method of claim 26, wherein the formaldehyde scavenger is selected from the group consisting of ethylene urea, diethylene glycol, and a mixture thereof.

28. The method of claim 27, wherein the formaldehyde scavenger is in an amount of 0.1 to 1% weight with respect to the weight of the emulsion mixture.

29. The method of claim 27, wherein the formaldehyde scavenger is in an amount of 0.3 to 0.6% weight with respect to the weight of the emulsion mixture.

30. The method of claim 26, wherein the formaldehyde scavenger is added at about 0.5 to 1 hour before the end of the step of maintaining the temperature of the encapsulation mixture at about 70 to 80° C.

31. The method of claim 30 further comprising the step of adjusting the pH of the encapsulation mixture to about 7.5 after the end of the step of maintaining the temperature of the encapsulation mixture at about 70 to 80° C.

32. The method of claim 5, wherein said protective colloid is in an amount of 1.5 to 2.5% weight with respect to the weight of the second solution.

* * * * *